US011124390B2

(12) United States Patent
Sun et al.

(10) Patent No.: US 11,124,390 B2
(45) Date of Patent: Sep. 21, 2021

(54) PRESSURE SENSITIVE MAT

(71) Applicant: Otis Elevator Company, Farmington, CT (US)

(72) Inventors: Fanping Sun, Glastonbury, CT (US); Joseph V. Mantese, Ellington, CT (US); Walter Thomas Schmidt, Marlborough, CT (US); Enrico Manes, Feeding Hills, MA (US); Goran Djuknic, New York, NY (US); Paul R. Braunwart, Hebron, CT (US); Wayde R. Schmidt, Pomfret Center, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 699 days.

(21) Appl. No.: 15/986,490

(22) Filed: May 22, 2018

(65) Prior Publication Data
US 2019/0359452 A1   Nov. 28, 2019

(51) Int. Cl.
| B66B 13/26 | (2006.01) |
| B66B 13/22 | (2006.01) |
| H01H 3/14 | (2006.01) |
| E05F 15/44 | (2015.01) |
| G01V 8/10 | (2006.01) |
| F16P 3/12 | (2006.01) |

(52) U.S. Cl.
CPC .............. *B66B 13/26* (2013.01); *E05F 15/44* (2015.01); *F16P 3/12* (2013.01); *G01V 8/10* (2013.01); *H01H 3/141* (2013.01); *E05Y 2900/104* (2013.01); *E05Y 2900/132* (2013.01); *H01H 2003/147* (2013.01)

(58) Field of Classification Search
CPC ..... B66B 1/468; B66B 5/0018; B66B 1/3492; B66B 5/0012; B66B 1/3476; B66B 13/22; B66B 13/26; B66B 2201/223
See application file for complete search history.

(56) References Cited

U.S. PATENT DOCUMENTS

| 2,867,291 | A | * | 1/1959 | Pierson ................. | B66B 13/143 |
| | | | | | 187/317 |
| 3,821,500 | A | | 6/1974 | Newman | |
| 3,830,991 | A | | 8/1974 | Durocher | |
| 4,143,367 | A | | 3/1979 | Schestag | |
| 4,467,251 | A | | 8/1984 | Jonsson | |
| 4,876,765 | A | | 10/1989 | Karita | |
| 4,924,214 | A | * | 5/1990 | Hill ........................ | G08B 13/10 |
| | | | | | 200/86.5 |
| 5,258,586 | A | | 11/1993 | Suzuki et al. | |
| 5,886,307 | A | | 3/1999 | Full et al. | |

(Continued)

FOREIGN PATENT DOCUMENTS

| CN | 1931697 A | 3/2007 |
| CN | 201788041 U | 4/2011 |

(Continued)

*Primary Examiner* — Marlon T Fletcher
(74) *Attorney, Agent, or Firm* — Cantor Colburn LLP

(57) ABSTRACT

A pressure sensitive mat is provided. The pressure sensitive mat includes a nanocomposite film, a first conductive foil, an oxide layer interposed between a first side of the nanocomposite film and the first conductive foil, a second conductive foil and a nanotube film interposed between a second side of the nanocomposite film, which is opposite the first side, and the second conductive foil.

17 Claims, 4 Drawing Sheets

(56) References Cited

U.S. PATENT DOCUMENTS

| | | | |
|---|---|---|---|
| 6,329,617 B1* | 12/2001 | Burgess | H01H 3/141 |
| | | | 200/512 |
| 6,496,220 B2 | 12/2002 | Landert et al. | |
| 7,140,469 B2 | 11/2006 | Deplazes et al. | |
| 7,281,610 B2 | 10/2007 | Ylinen et al. | |
| 8,020,672 B2 | 9/2011 | Lin et al. | |
| 8,260,042 B2 | 9/2012 | Peng et al. | |
| 9,481,548 B2* | 11/2016 | Siddiqui | B66B 1/3476 |
| 2007/0037559 A1 | 2/2007 | Kaiserman et al. | |
| 2007/0068741 A1 | 3/2007 | Janos et al. | |
| 2015/0075914 A1 | 3/2015 | Armistead et al. | |
| 2016/0031675 A1 | 2/2016 | Silvennoinen et al. | |
| 2016/0292515 A1 | 10/2016 | Jia et al. | |
| 2016/0347577 A1 | 12/2016 | Simcik et al. | |
| 2017/0275134 A1 | 9/2017 | Toner et al. | |
| 2019/0218847 A1* | 7/2019 | Agam | G01S 17/894 |
| 2019/0346588 A1* | 11/2019 | Hsu | B66B 25/003 |
| 2019/0359452 A1* | 11/2019 | Sun | E05F 15/40 |
| 2020/0354190 A1* | 11/2020 | Girard | G07C 9/29 |

FOREIGN PATENT DOCUMENTS

| | | |
|---|---|---|
| CN | 203653025 U | 6/2014 |
| CN | 105587204 A | 5/2016 |
| DE | 1279901 B | 10/1968 |
| DE | 102013209368 A1 | 11/2014 |
| EP | 0107012 B1 | 4/1986 |
| WO | 2016142968 A1 | 9/2016 |

\* cited by examiner

PRESSURE SENSITIVE MAT

BACKGROUND

The following description relates to a pressure sensitive mat and, more particularly, to a pressure sensitive mat that can provide at least one of passenger safety and a hands-free elevator call capability.

Passenger elevators are often equipped with some form of obstacle detection to protect passengers from door strikes and finger pinches when the doors close. Such detection systems have commonly taken the form of light curtains, radar sensors, acoustic and ultrasonic interrogations and camera systems spanning from the visible to the long wavelength infrared.

Many of these detection systems work well when the obstacle of concern is in the plane defined by the door frame. Detection of obstacles oriented normally to the opening or outside of door frame is more challenging, however, as such out-of-plane detections are routinely based upon receiving reflected energy from an acoustic, optical or electromagnetic transmitted energy source. Oftentimes, unwanted re-openings of the elevator doors occur due to stray signals from reflections of persons in the vicinity of the door but who are not intending to enter the elevator, thus leading to high false alarm rates (FAR). Conversely, improper settings or poor detector system discrimination may lead to undetected obstacles.

In certain elevator systems, there may also be a need to request an elevator to a specific floor when an individual has a limited ability to press/use the traditional call buttons in a lobby. For example, when an individual is in a wheelchair or when a person's arms are full when carrying packages.

BRIEF DESCRIPTION

According to another aspect of the disclosure, a personal transportation system is provided and includes a body configured to transport an individual from a first location to a second location, the body including doors which are movable in a plane between open and closed positions, an entryway located at the first location and including a pressure sensitive mat configured to detect a presence of the individual out of the plane in which the doors are movable and a control system configured to control movements of the doors between the open and closed positions based on a reading of the pressure sensitive mat.

In accordance with additional or alternative embodiments, additional sensors are configured to sense individuals in and around the entryway wherein the body includes an elevator car and the doors comprise first and second elevator doors and the reading of the pressure sensitive mat and readings of the additional sensors are analyzed and interpreted by the control system for executing corresponding door actions.

In accordance with additional or alternative embodiments, in an event the reading of the pressure sensitive mat and readings of the additional sensors are indicative of an individual being present in the plane, the control system controls the movements of the doors by at least one of maintaining the doors in an open condition, continuing an opening of the doors and reversing a closing of the doors.

In accordance with additional or alternative embodiments, in an event the reading of the pressure sensitive mat and readings of the additional sensors are indicative of an individual being present in the entryway with intent and authorization to board the elevator car, the control system controls the movements of the doors by at least one of maintaining the doors in an open condition, continuing an opening of the doors and reversing a closing of the doors.

In accordance with additional or alternative embodiments, wherein the intent to board the elevator car is indicated by at least one of pressure of a predefined magnitude being applied to the pressure sensitive mat for a predefined period of time and readings of the additional sensors that are indicative of the individual being rushed.

In accordance with additional or alternative embodiments, the authorization to board the elevator car is indicated by evidence that the individual is not a small child.

In accordance with additional or alternative embodiments, the pressure sensitive mat includes a laminated, rubbery layer and a pressure sensitive thin film embedded underneath the laminated, rubbery layer, the pressure sensitive film including at least one of polyvinylidene fluoride (PVDF) and lead zirconate titanate (PZT).

In accordance with additional or alternative embodiments, the pressure sensitive mat includes a nanocomposite film, a first conductive foil, an oxide layer interposed between a first side of the nanocomposite film and the first conductive foil, a second conductive foil and a nanotube film interposed between a second side of the nanocomposite film, which is opposite the first side, and the second conductive foil, wherein the nanocomposite film includes at least one of polyvinylidene fluoride (PVDF) and lead zirconate titanate (PZT).

In accordance with additional or alternative embodiments, high impedance circuitry is receptive of a charge from the pressure sensitive mat.

In accordance with additional or alternative embodiments, the pressure sensitive mat includes energy harvesting circuitry.

According to yet another aspect of the disclosure, a hands-free call system of a personal transportation system is provided and includes a body configured to transport an individual from a first location to a second location, an entryway located at the first location and including a pressure sensitive mat configured to detect a presence of the individual, which is readable as a call, and a control system configured to control operations of the body responsive to the call based on a reading of the pressure sensitive mat.

In accordance with additional or alternative embodiments, the body includes an elevator car, the hands-free call system further includes at least one of a wall mounted call mechanism and an optical call mechanism and weight, time and noise characteristics of the reading of the pressure sensitive mat are analyzed and interpreted by the control system as the call.

In accordance with additional or alternative embodiments, the pressure sensitive mat includes ascend and descend sections.

In accordance with additional or alternative embodiments, the control system interprets pressure of a predefined magnitude and time on the ascend and descend sections as ascend and descend calls, respectively.

In accordance with additional or alternative embodiments, the pressure sensitive mat includes a visible progress indicator.

In accordance with additional or alternative embodiments, the control system controls the visible progress indicator to indicate a remaining period of time required for pressure to be applied to the pressure sensitive mat to initiate the call.

In accordance with additional or alternative embodiments, the pressure sensitive mat includes a laminated, rubbery layer and a pressure sensitive thin film embedded underneath the laminated, rubbery layer, the pressure sensitive film including at least one of polyvinylidene fluoride (PVDF) and lead zirconate titanate (PZT).

In accordance with additional or alternative embodiments, the pressure sensitive mat includes a nanocomposite film, a first conductive foil, an oxide layer interposed between a first side of the nanocomposite film and the first conductive foil, a second conductive foil and a nanotube film interposed between a second side of the nanocomposite film, which is opposite the first side, and the second conductive foil.

In accordance with additional or alternative embodiments, the nanocomposite film includes at least one of polyvinylidene fluoride (PVDF) and lead zirconate titanate (PZT).

In accordance with additional or alternative embodiments, high impedance circuitry is receptive of a charge from the pressure sensitive mat.

In accordance with additional or alternative embodiments, the pressure sensitive mat includes energy harvesting circuitry.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

These and other advantages and features will become more apparent from the following description taken in conjunction with the drawings.

DETAILED DESCRIPTION

As will be described below, an alternative obstacle detection system is provided for in- and out-of-plane detections and designed to lower the false alarm rate ("FAR") and decrease missed detections at lower cost than conventional systems. The obstacle detection system includes a low-cost, pressure sensitive elevator landing door mat ("PSLDM"). The door mat can also provide for a hands-free call system in which an individual could walk onto the door mat, stand for an appropriate amount of time and thus generate a call signal.

Figure 1:
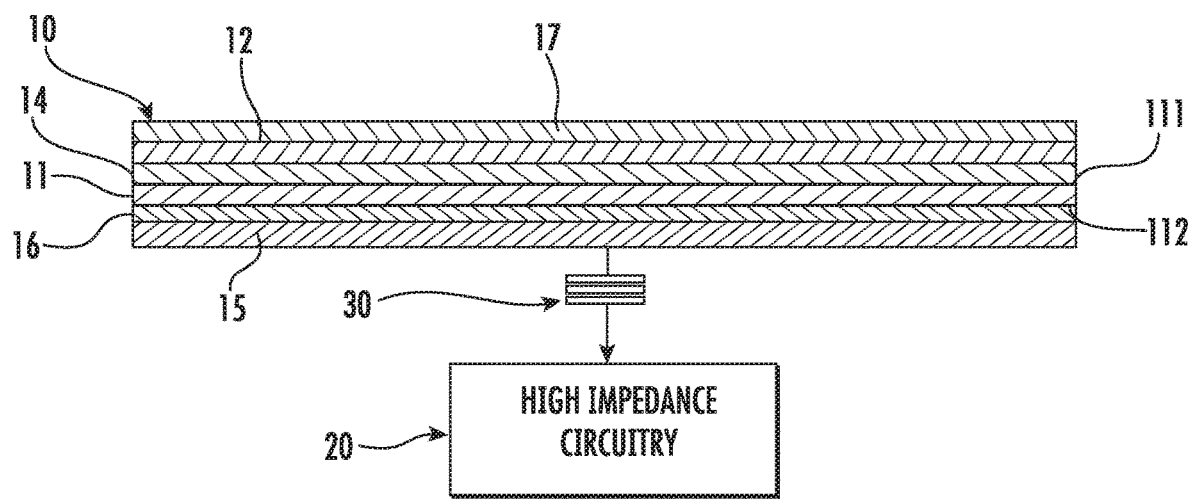
FIG. 1 is a schematic side view of a pressure sensitive mat in accordance with embodiments.

With reference to FIG. 1, a pressure sensitive mat 10 is provided. The pressure sensitive mat 10 includes a nanocomposite film 11, a first conductive foil 12 made of aluminum, for example, an oxide layer 14, which is interposed between a first side 111 of the nanocomposite film 11 and the first conductive foil 12, a second conductive foil 15 made of copper, for example, and a nanotube film 16. The nanotube film 16 is interposed between a second side 112 of the nanocomposite film 11, which is opposite the first side 111, and the second conductive foil 15. The nanocomposite film 11 may include at least one of polyvinylidene fluoride (PVDF) and lead zirconate titanate (PZT) as a piezoelectric feature and may have a thickness of about 20-200 µm. In one embodiment, the nanocomposite film 11 may be of any desired thickness. The nanocomposite film 11 may also be compliant and deformable under pressure. The oxide layer 14 may include lithium cobalt oxide ($LiCoO_2$) and the nanotube film 16 may include multi-wall carbon nanotubes (MWCNTs).

In accordance with embodiments, the pressure sensitive mat 10 can be disposed underneath a laminated and/or rubberized layer 17, with a roughened or frictional surface in some cases to prevent slippage. In addition, the pressure sensitive mat 10 can be disposed with either the first conductive foil 12 or the second conductive foil 15 as an uppermost layer. Moreover, the oxide layer 14 and the nanotube film 16 may be switched. The following description will relate only to the case in which the first conductive foil 12 is the uppermost layer of the pressure sensitive mat 10 and the oxide layer 14 is interposed between the first conductive foil 12 and the first side 111 of the nanocomposite film 11. This is done for clarity and brevity and is not intended to otherwise limit the scope of this disclosure. Moreover, it should be understood that the above-described construction of the pressure sensitive mat 10 is for exemplary purposes only and that any desired structure may be used.

The pressure sensitive mat 10, when employed in a personal transportation system or a hands-free call system, as described below, may be disposed in a floor of a building or a structure and may be configured and disposed to be weighed on by an individual (either standing or in a wheelchair). During an operation of the pressure sensitive mat 10 in such cases dynamic pressure applied to the first conductive foil 12 causes the nanocomposite film 11 to generate a charge due to its inverse piezoelectric effect. This charge has a magnitude that corresponds to an amount of the pressure that is applied to the first conductive foil 12. That is, a heavy adult man standing on the pressure sensitive mat 10 (or the layer 17 above the pressure sensitive mat 10) will cause a greater charge to be generated than a toddler or a small object, such as a shopping cart, a suitcase or a pet.

In accordance with embodiments and, as shown in FIG. 1, high impedance circuitry 20 may be provided as a component of the pressure sensitive mat 10 or as a standalone feature. In either case, the high impedance circuitry 20 is configured to be receptive of the charge generated by the pressure sensitive mat 10 when the dynamic pressure is applied. The high impedance circuitry 20 may include or be provided as an analog-to-digital converter (ADC), which converts the charge generated by the pressure sensitive mat 10 into a voltage signal. This voltage signal can be employed in operations of the personal transportation system or the hands-free call system.

In accordance with further embodiments and, as shown in FIG. 1, the pressure sensitive mat 10 may include energy harvesting circuitry 30. The energy harvesting circuitry 30 may be configured to self-power the pressure sensitive mat 10 for thus executing signal conditioning and to power wireless transmissions.

Figure 2:
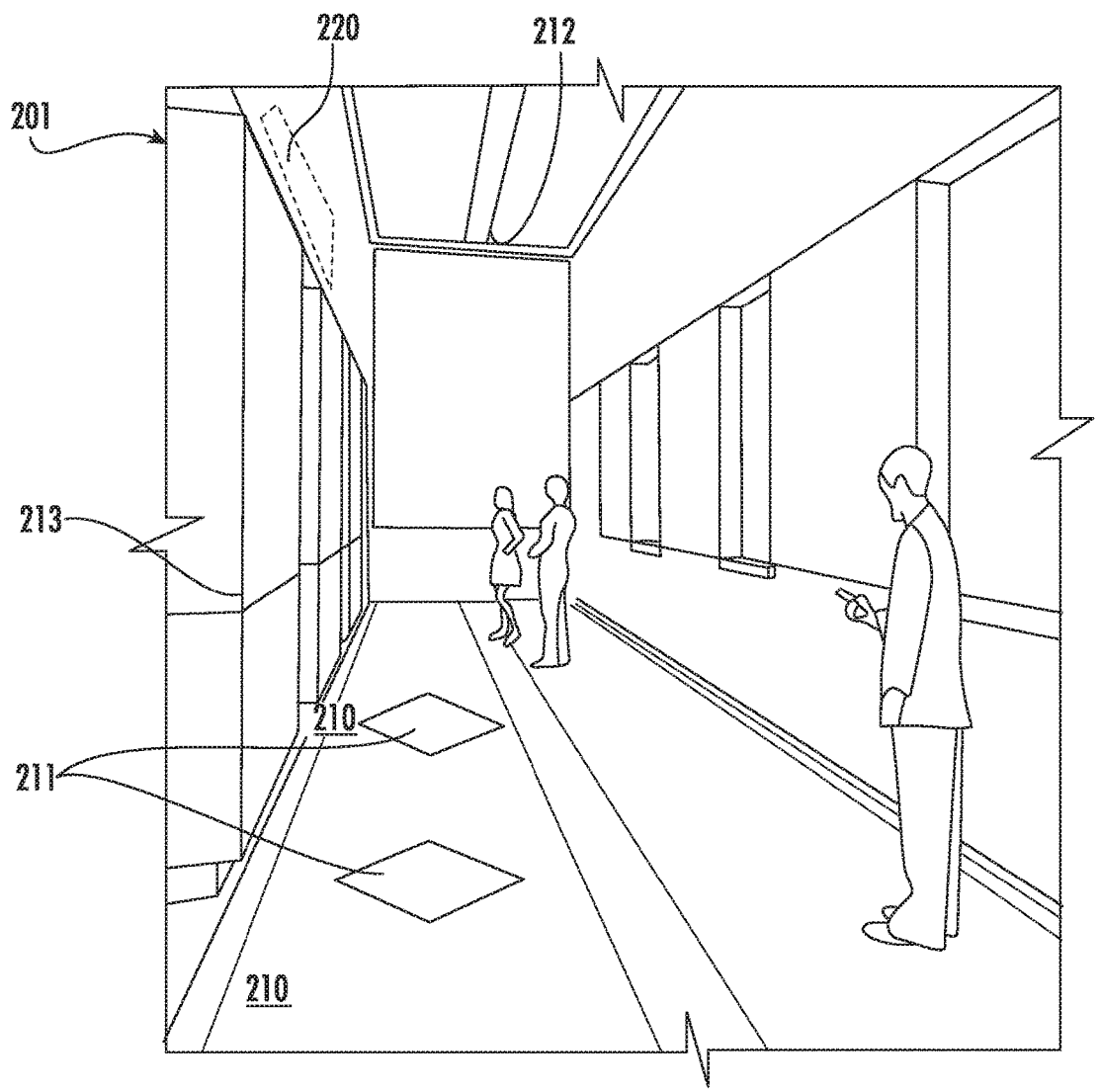
FIG. 2 is a perspective illustration of a personal transportation system including the pressure sensitive mat of FIG. 1 in accordance with embodiments.
Figure 3:
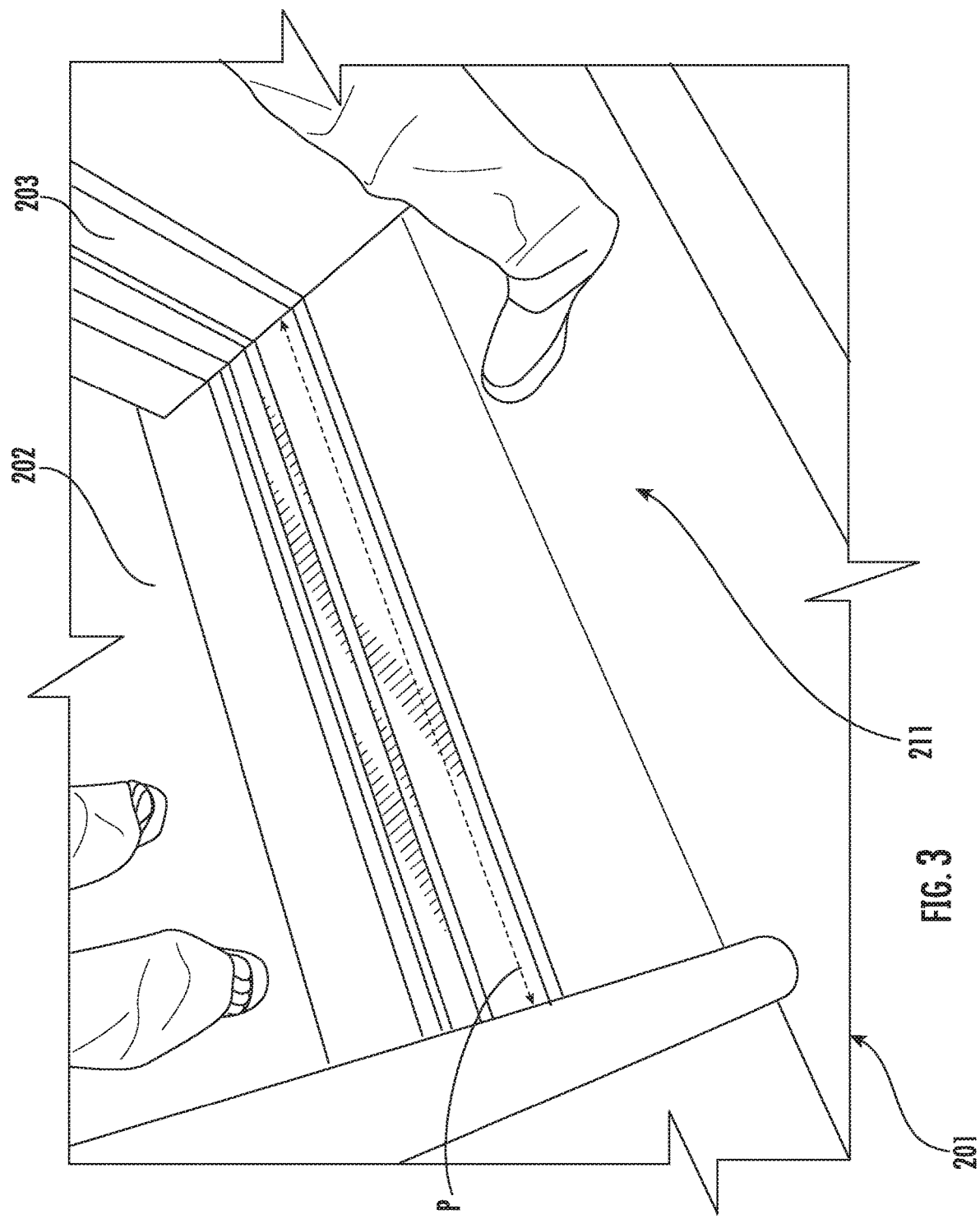
FIG. 3 is an enlarged illustration of a component of the personal transportation system of FIG. 2.

With reference to FIGS. 2 and 3, a personal transportation system 201 is provided. The personal transportation system 201 includes a body 202 (see FIG. 3), which is configured to transport an individual from a first location to a second location, an entryway 210 including a pressure sensitive mat 211 as described above and a control system 220 (see FIG. 2). The personal transportation system 201 may be provided or configured as an elevator system, an escalator system, a moving walkway system, a subway or commuter train or another similar type of system. The following description will relate only to the case in which the personal transportation system 201 is an elevator system. This is done for clarity and brevity and is not intended to otherwise limit the scope of the disclosure.

With the personal transportation system 201 being provided as the elevator system, the body 202 may include or be provided as an elevator car and includes doors 203 (see FIG. 3). The doors 203 are movable in a plane P between open and closed positions (see FIG. 3). The entryway 210 is located at least at the first location with the pressure sensitive mat 211 being disposed and configured to detect a presence of the individual out of the plane P in which the doors 203 are movable. In accordance with embodiments, the pressure sensitive mat 211 may extend along a width of the entryway 210 or, more particularly, a width of the opening formed by the doors 203 when they are open and may extend outwardly from the plane P by 1 or more feet (e.g., about 3 feet). In some cases, the pressure sensitive mat 211 may be semi-circular, rectangular, or any other suitable shape.

The entryway 210 may further include additional sensor equipment 212, such as optical cameras, RADAR and LIDAR to determine a presence of the individual in the plane P or out of the plane P as well as further control elements 213, such as a wall mounted call or optical call mechanism or, more simply, call buttons, and indicator lights, such as floor lights showing where the elevator car is located and in what direction it is moving. The control system 220 is coupled to the pressure sensitive mat 211 and the additional sensor equipment 212 and is configured to control movements of the doors 203 between the open and closed positions based on respective readings of the pressure sensitive mat 211, the additional sensor equipment 212 and operations of the further control elements 213. That is, the control system 220 will analyze and interpret the respective readings to cause the doors 203 to take actions corresponding to those readings. Such analysis and interpretation may involve reviewing a pattern of the readings in terms of signal magnitude, frequency, etc., while the actions include reversing motions of the doors 203, closing the doors 203, stopping the motions of the doors 203 and interlocking lift traction systems.

Figure 4:
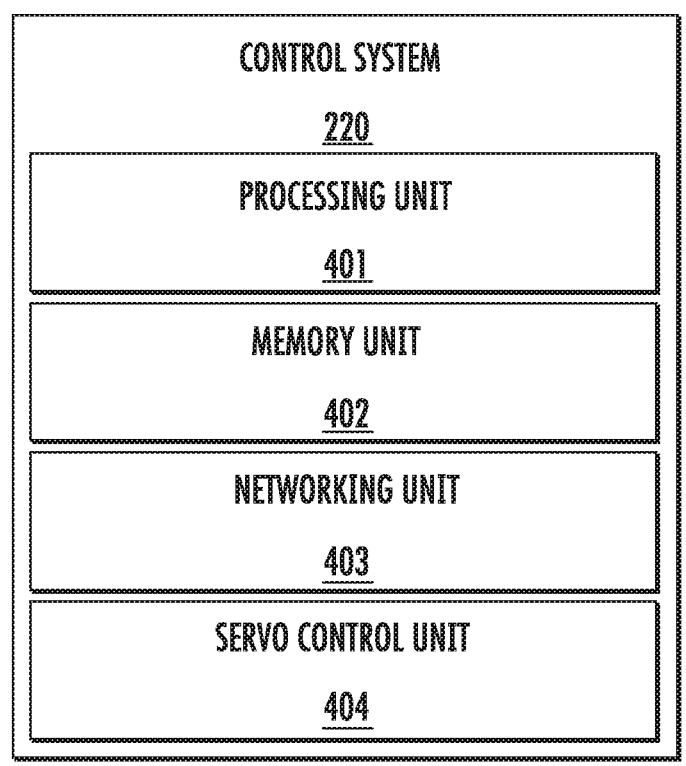
FIG. 4 is a schematic diagram of a control system of the personal transportation system of FIGS. 2 and 3 in accordance with embodiments.

With reference to FIG. 4, the control system 220 may be disposed in signal communication with the pressure sensitive mat 211 or, more particularly, with the high impedance circuitry 20 of the pressure sensitive mat 211 and with the additional sensor equipment 212 and the further control elements 213. The control system 220 includes a processing unit 401, a memory unit 402, a networking unit 403 by which the processing unit 401 communicates via wired or wireless connections with the pressure sensitive mat 211 and the additional sensor equipment 212 and a servo control unit 404 which is operable by the processing unit 401 to control movements of the doors 203. The memory unit 402 has historical data and executable instructions stored thereon, which are readable and executable by the processing unit 401. When the executable instructions are read and executed by the processing unit 401, the executable instructions cause the processing unit 401 and the control system 220 as a whole to operate as described herein.

In an exemplary case, the control system 220 may prevent the doors 203 from closing in an event that the pressure sensitive mat 211 or the additional sensor equipment 212 detects the presence of the individual in the plane P or if an individual has actuated the further control elements 213 even if the doors 203 had already begun closing in order to avoid having the doors 203 potentially closing on the individual. The control system 220 will do this by stopping the door closing engine. The control system 220 may also reverse the drive of the door closing engine and then re-engage the door closing engine in the reverse direction to re-open the doors 203.

As such actions are time and energy consuming, the control system 220 may also prevent the doors 203 from beginning to close in accordance with the readings of the pressure sensitive mat 211 being indicative of the individual being close to the doors 203 and thus potentially having an extremity in the plane P. As an additional feature, the control system 220 may open the doors 203 even if they are closing or are already closed (and the elevator car is still at the first location) in accordance with the readings of the pressure sensitive mat 211 being indicative of the individual recently arriving at the entryway 210 and wanting to board the elevator car. Here, the control system 220 may interpret a reading of the pressure sensitive mat 211, which is derived from a relatively large charge and is thus indicative of an adult having recently stepped on the pressure sensitive mat 211, and a reading of the additional sensor equipment 212.

The read of the additional sensor equipment 212 may reveal or otherwise be indicative of the adult having run toward the entryway 210 and being optically observed while doing so by optical cameras. While such an observation by optical cameras could be done even if the adult never has an opportunity to actuate the further control elements 213, the observation and associated data generated from the observation could be read by the control system 220 as an indication that the adult is in a rush and needs to board the elevator car even if it is about to leave the first location. The control system 220 could therefore hold the elevator car in place with the doors open to thus allow the adult to board without having to wait for a next elevator car to arrive and board.

On the other hand, if the reading of the pressure sensitive mat 211 is indicative of the individual being in a rush but that the individual is a small child (as in a case in which the charge generated by the pressure sensitive mat 211 is relatively small due to the low body weight of the small child not applying a significant amount of pressure on the pressure sensitive mat 211), the control system 220 may interpret the reading as an indication that the small child might be acting as though he wants to board but should not be permitted to do so. In such cases, the control system 220 might take an action which will prevent the small child from boarding. In some cases, the control system 220 might at least not take an action to allow the small child to board in the absence of evidence that the small child is accompanied by an adult.

Figure 5:
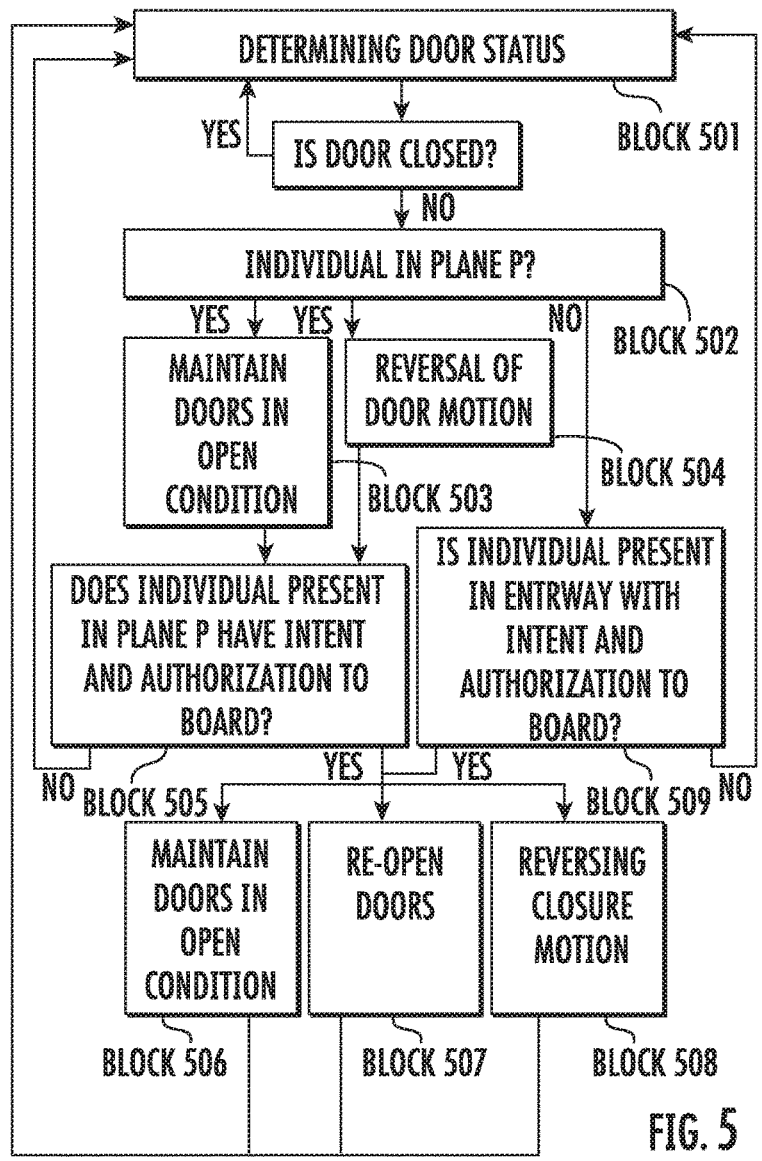
FIG. 5 is a flow diagram illustrating a method of operating a personal transportation system in accordance with embodiments.

With reference to FIG. 5, a method of operating the personal transportation system 201 is provided and includes an initial determination by the processing unit 301 of the control system 220 as to a status of the doors 203 (block 501). This initial determination may be employed to ascertain whether the doors 203 are open, closed, in the process of opening, in the process of closing, etc. In an event the doors 203 are closed control reverts to block 501. In an event the doors 203 are not closed (e.g., they are open, in the process of opening or in the process of closing), the method further includes an interrogation of the pressure sensitive mat 211 and the additional sensor equipment 212 as to a presence of an individual in the plane P (block 502). In an event an individual is present in the plane P, the control system 220 maintains the doors 203 in the open condition if they are open or continues to open the doors 203 if they are in the process of opening (block 503) or, in an event the doors 203 are closed, the control system 220 reverses the movements of the doors 203 (block 504). The reversal of the movements of the doors 203 of block 504 avoids or prevent an impact between the doors 203 and any portion of the individual as the doors 203 close.

Following the actions of block 503 and 504, the method includes an interrogation of at least the additional sensor equipment 212 to ascertain whether the individual present in the plane P has an intent and authorization to board the elevator car (block 505). Intent to board can be determined from readings of pressures of a predefined magnitude (e.g., those of an adult) are applied to the pressure sensitive mat 211 for a predefined period of time (e.g., 5-10 seconds) and/or from evidence that the individual is in a rush from readings that the individual was running toward the entryway 210 by the additional sensor equipment 212 and repeated actuations of the further control elements 213. Authorization to board may be determined from such things as a determination that the individual is not a small child as evidenced by the readings of the pressure sensitive mat 211 showing that pressure applied thereto is relatively large. In an event that intent and authorization to board are established, the method may include maintaining the doors 203 in an open condition (block 506), re-opening the doors 203 if they had recently closed and the elevator car was still present at the first location (block 507) or reversing the closure of the doors 203 in an event the doors 203 are in the process of closing (block 508).

In an event no individual is determined to be present in the plane P in block 502, the method also includes an interrogation of the pressure sensitive mat 211 as well as the additional sensor equipment 212 to ascertain whether an individual is present in the entryway 210 with an intent and authorization to board the elevator car (block 509). Here, intent to board can be determined from readings of pressures of a predefined magnitude (e.g., those of an adult) are applied to the pressure sensitive mat 211 for a predefined period of time (e.g., 5-10 seconds) and/or from pressure being applied to the pressure sensitive mat 211, evidence that the individual is in a rush from readings that the individual was running toward the entryway 210 by the additional sensor equipment 212 and repeated actuations of the further control elements 213. Authorization to board may be determined from such things as a determination that the individual is not a small child as evidenced by the readings of the pressure sensitive mat 211 showing that pressure applied thereto is relatively large. At this point, in an event that intent and authorization to board are established, the method may include the maintaining of the doors 203 in the open condition of block 506, the re-opening of the doors 203 if they had recently closed and the elevator car was still present at the first location of block 507 or the reversing the closure of the doors 203 in an event the doors 203 are in the process of closing of block 508.

Following the maintaining of the doors 203 in the open condition of block 506, the re-opening of the doors 203 if they had recently closed and the elevator car was still present at the first location of block 507 or the reversing of the closure of the doors 203 in an event the doors 203 are in the process of closing of block 508, control reverts to block 501 such that the method described herein can be iteratively repeated.

With reference back to FIGS. 2 and 3, the personal transportation system 201 may also include or be provided with a hands-free call system 401. The hands-free call system 401 may be provided by the pressure sensitive mat 211 and the control system 220 with the control system 220 being configured to read certain pressures (e.g., pressures applied by adult individuals for a certain period of time) being applied to the pressure sensitive mat 211 and then determining that those pressures are indicative of a call being made for the elevator car regardless of whether or not the further control elements 213 have been actuated. In an exemplary case, the pressure sensitive mat 211 could be embedded within or beneath a floor tile 2110 (see FIG. 2) or laid beneath carpet 2111 (see FIG. 3) in the entryway 210 and near an elevator car. An individual could walk to that space with loaded arms, for example, stand for an appropriate amount of time on a designated spot in the entryway 210, and the elevator car would be called to that floor by the control system 220.

In accordance with embodiments, the appropriate time could be set automatically at a few seconds (e.g., 5-10 seconds with a visible progress indicator being made available to the individual) in view of historical data or by an operator. In either case, the appropriate time may be defined long enough to be indicative of the individual's intent to board or at least to call the elevator car for a different reason.

Figure 6:
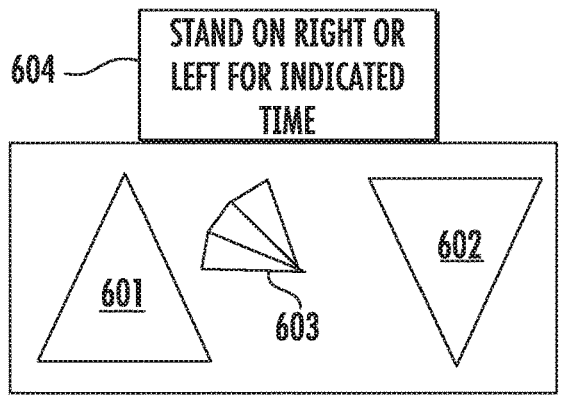
FIG. 6 is a schematic illustration of sections of a pressure sensitive mat in accordance with embodiments.

With reference to FIG. 6 and, in accordance with further embodiments, the pressure sensitive mat 211 could include multiple sections 601 and 602, such as a left-side section indicative of the individual's desire to descend and a right-side section indicative of the individual's desire to ascend, and a visible indicator 603. In accordance with still further embodiments, to the extent the pressure sensitive mat 211 is disposed underneath the floor tile 211 or the carpet 211, markings 604 on the floor tile/carpet could be provided to indicate where and for how long the individual needs to stand to make a call.

Benefits of the features described herein are that the pressure sensitive mat 211 can provide for a low-cost alternative sensing approach to the approaches that rely on energy radiation interrogation based systems. When combined with the currently prevalent light curtain systems, it can cover most of the causes of passenger strikes and finger pinch incidents. As the pressure sensitive mat 211 is a nearly zero value active solid state sensor, it is simple to install, requires little maintenance and power to operate, therefore mitigates customer call-backs.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A personal transportation system, comprising:
a body configured to transport an individual from a first location to a second location,
the body comprising doors which are movable in a plane between open and closed positions;
an entryway located at the first location and comprising a pressure sensitive mat configured to detect a presence of the individual out of the plane in which the doors are movable; and
a control system configured to control movements of the doors between the open and closed positions based on a reading of the pressure sensitive mat,
wherein the pressure sensitive mat comprises:
a first film;
one of a layer and a second film interposed between the first film and a first conductive foil; and
the other of the layer and the second film interposed between the first film and a second conductive foil.

2. The personal transportation system according to claim 1, further comprising additional sensors configured to sense individuals in and around the entryway wherein:
the body comprises an elevator car and the doors comprise first and second elevator doors, and
the reading of the pressure sensitive mat and readings of the additional sensors are analyzed and interpreted by the control system for executing corresponding door actions.

3. The personal transportation system according to claim 2, wherein, in an event the reading of the pressure sensitive mat and readings of the additional sensors are indicative of an individual being present in the plane, the control system controls the movements of the doors by at least one of:
maintaining the doors in an open condition;
continuing an opening of the doors; and
reversing a closing of the doors.

4. The personal transportation system according to claim 2, wherein, in an event the reading of the pressure sensitive mat and readings of the additional sensors are indicative of an individual being present in the entryway with intent and authorization to board the elevator car, the control system controls the movements of the doors by at least one of:
maintaining the doors in an open condition;
continuing an opening of the doors; and
reversing a closing of the doors.

5. The personal transportation system according to claim 4, wherein the intent to board the elevator car is indicated by at least one of:
pressure of a predefined magnitude being applied to the pressure sensitive mat for a predefined period of time, and
readings of the additional sensors that are indicative of the individual being rushed.

6. The personal transportation system according to claim 4, wherein the authorization to board the elevator car is indicated by evidence that the individual is not a small child.

7. The personal transportation system according to claim 1, wherein the pressure sensitive mat comprises:
a laminated, rubbery layer; and
a pressure sensitive thin film embedded underneath the laminated, rubbery layer,
the pressure sensitive film comprising at least one of polyvinylidene fluoride (PVDF) and lead zirconate titanate (PZT).

8. The personal transportation system according to claim 1, wherein:
the first film comprises a nanocomposite film, the second film comprises a nanotube film and the layer comprises an oxide layer;
a first conductive foil;
the oxide layer is interposed between a first side of the nanocomposite film and the first conductive foil,
the nanotube film is interposed between a second side of the nanocomposite film, which is opposite the first side, and the second conductive foil, and
the nanocomposite film comprises at least one of polyvinylidene fluoride (PVDF) and lead zirconate titanate (PZT).

9. The personal transportation system according to claim 1, further comprising high impedance circuitry to be receptive of a charge from the pressure sensitive mat.

10. The personal transportation system according to claim 1, wherein the pressure sensitive mat comprises energy harvesting circuitry.

11. A hands-free call system of a personal transportation system, comprising:
a body comprising an elevator car configured to transport an individual from a first location to a second location;
an entryway located at the first location and comprising a pressure sensitive mat configured to detect a presence of the individual, which is readable as a call;
a control system configured to control operations of the body responsive to the call based on a reading of the pressure sensitive mat; and
at least one of a wall mounted call mechanism and an optical call mechanism,
wherein:
the pressure sensitive mat comprises ascend and descend sections,
weight, time and noise characteristics of the reading of the pressure sensitive mat are analyzed and interpreted by the control system as the call, and
the control system interprets pressure of a predefined magnitude and time on the ascend and descend sections as ascend and descend calls, respectively.

12. The hands-free call system according to claim 11, wherein the pressure sensitive mat comprises:
a laminated, rubbery layer; and
a pressure sensitive thin film embedded underneath the laminated, rubbery layer,
the pressure sensitive film comprising at least one of polyvinylidene fluoride (PVDF) and lead zirconate titanate (PZT).

13. The hands-free call system according to claim 11, wherein the pressure sensitive mat comprises:
a nanocomposite film;
a first conductive foil;
an oxide layer interposed between a first side of the nanocomposite film and the first conductive foil;
a second conductive foil; and
a nanotube film interposed between a second side of the nanocomposite film, which is opposite the first side, and the second conductive foil, wherein the nanocomposite film comprises at least one of polyvinylidene fluoride (PVDF) and lead zirconate titanate (PZT).

14. The hands-free call system according to claim 11, further comprising high impedance circuitry to be receptive of a charge from the pressure sensitive mat.

15. The hands-free call system according to claim 11, wherein the pressure sensitive mat comprises energy harvesting circuitry.

16. A hands-free call system of a personal transportation system, comprising:

a body comprising an elevator car configured to transport an individual from a first location to a second location;

an entryway located at the first location and comprising a pressure sensitive mat configured to detect a presence of the individual, which is readable as a call;

a control system configured to control operations of the body responsive to the call based on a reading of the pressure sensitive mat; and at least one of a wall mounted call mechanism and an optical call mechanism, wherein weight, time and noise characteristics of the reading of the pressure sensitive mat are analyzed and interpreted by the control system as the call and the pressure sensitive mat comprises a visible progress indicator.

17. The hands-free call system according to claim 16, wherein the control system controls the visible progress indicator to indicate a remaining period of time required for pressure to be applied to the pressure sensitive mat to initiate the call.

* * * * *